US00RE36804E

United States Patent [19]

Kajihara et al.

[11] E Patent Number: Re. 36,804

[45] Reissued Date of Patent: Aug. 1, 2000

[54] BEARING SEALING DEVICE AND BEARING SEALING MECHANISM CAPABLE OF PREVENTING THE LEAKAGE OF GREASE

[75] Inventors: Kazuhisa Kajihara, Yao; Masatosi Taniyama, Kashihara; Kunio Yanai, Kitakatsuragi-gun; Hiroshi Ueno, Tondabayashi, all of Japan

[73] Assignee: Koyo Seiko Co., Ltd., Osaka, Japan

[21] Appl. No.: 09/213,900

[22] Filed: Dec. 17, 1998

Related U.S. Patent Documents

Reissue of:

[64] Patent No.: 5,607,240
Issued: Mar. 4, 1997
Appl. No.: 08/595,248
Filed: Feb. 1, 1996

[30] Foreign Application Priority Data

Feb. 3, 1995 [JP] Japan ..... 7-016816
Aug. 2, 1995 [JP] Japan ..... 7-197384

[51] Int. Cl.[7] ..... F16C 33/72; F16C 33/80

[52] U.S. Cl. ..... 384/480; 277/402; 277/411; 384/470; 384/484

[58] Field of Search ..... 384/477, 480, 384/484, 486, 488, 470; 277/402, 411, 412, 418, 549, 565

[56] References Cited

U.S. PATENT DOCUMENTS 3,396,977 8/1968 Iguchi .
4,505,484 3/1985 Ohkuma et al. ..... 384/486 X
4,533,265 8/1985 Woodbridge ..... 277/29 X
4,655,617 4/1987 Yasui et al. ..... 384/488 X
4,770,548 9/1988 Otto ..... 277/29 X
4,772,138 9/1988 Dreschmann et al. ..... 384/484 X
4,830,518 5/1989 Shiratani et al. .
4,854,749 8/1989 Kohigashi et al. ..... 384/482

FOREIGN PATENT DOCUMENTS 2 071 788 9/1981 United Kingdom .

*Primary Examiner*—Thomas R. Hannon
*Attorney, Agent, or Firm*—Wenderoth, Lind & Ponack, L.L.P.

[57] ABSTRACT

There is provided a bearing sealing device capable of substantially completely preventing a leak of grease. A taper end portion of an axial extension of the bearing sealing device has an opposite surface and a rake face that forms a specified rake angle with the opposite surface. The opposite surface forms a narrow passage between the opposite surface and an outer peripheral surface of an inner ring. The narrow passage allows air to pass easily, but it allows grease to hardly pass therethrough. Further, the axial extension includes part of a core metal that extends axially and has its foremost end located axially inside an axial outermost end of the outer peripheral surface of the inner ring. Grease moving axially outwardly on the outer peripheral surface is moved along the rake face of the taper end portion and then guided along a cover portion of the bearing sealing device to an outer ring. The part of the core metal prevents the axial extension from being bent radially outwardly by a centrifugal force.

4 Claims, 7 Drawing Sheets

BEARING SEALING DEVICE AND BEARING SEALING MECHANISM CAPABLE OF PREVENTING THE LEAKAGE OF GREASE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a bearing sealing device and a bearing sealing mechanism for outer ring rotating type bearings such as bearings for axles, and bearings for engine accessories like outer ring rotating type water pumps, idlers and tensioners.

2. Description of the Prior Art

Conventionally, as a bearing sealing device of this type, there is one as shown in FIG. 9. The sealing device includes a main lip 73 that is put in slidable contact with a side surface 72A located axially outwardly of an annular groove 72 formed on an outer peripheral surface 71A of an inner ring 71, and an auxiliary lip 75 provided with interposition of a specified clearance to a slant side surface 72B arranged opposite to the side surface 72A. The main lip 73 and the auxiliary lip 75 are converged at their roots to be integrated into one body, and a radially outward end portion (not shown) thereof is fixed to an outer ring (not shown).

In the sealing device, the auxiliary lip 75 intercepts grease from inside the bearing. Further, the grease that has passed around the auxiliary lip 75 is intercepted by the main lip 73.

However, in the above prior art bearing sealing device, a pressure force exerted from the main lip 73 on the side surface 72A is sometimes weakened by a centrifugal force depending on use conditions, and therefore the grease that has passed around the auxiliary lip 75 possibly passes around the main lip 73. The above also results in the problem that the leak of the grease is incompletely prevented.

SUMMARY OF THE INVENTION

The object of the present invention is therefore to provide a bearing sealing device and a bearing sealing mechanism capable of substantially completely preventing the leak of grease.

In order to achieve the above object, the present invention provides a bearing sealing device which is provided between an outer ring and an inner ring of a bearing in which the outer ring rotates, seals a space between the outer ring and the inner ring, and is securely fixed to the outer ring so as to rotate together with the outer ring, comprising:

a fixed portion fixed to the outer ring;

a cover portion which extends in a radially inward direction of the outer ring from the fixed portion and covers the space between the outer ring and the inner ring; and an axial extension which is made of an elastic material and extends in an axially inward direction of the outer ring from the cover portion, wherein the axial extension includes a taper end portion having an opposite surface which is opposed to an outer peripheral surface of the inner ring and forms between the opposite surface and the outer peripheral surface of the inner ring a narrow passage having a specified narrowness such that air is allowed to pass comparatively easily and oil is allowed to pass comparatively hardly, and a rake face forming a specified rake angle with the opposite surface; and the fixed portion, the cover portion and the axial extension respectively include part of a core metal, said core metal extending axially inwardly from the cover portion up to a position on a radially outer side of the outer peripheral surface of the inner ring, where a foremost end of the core metal is positioned in the vicinity of the taper end portion.

According to the bearing sealing device of the present invention, the opposite surface of the taper end portion forms the narrow passage between the opposite surface and the outer peripheral surface of the inner ring. The narrow passage allows air to pass comparatively easily, but it allows oil such as grease to pass comparatively hardly therethrough. Therefore, the grease moving axially outwardly on the outer peripheral surface of the inner ring is moved along the rake face having the specified rake angle upon reaching the taper end portion. Then, the grease moved along the rake face is guided to the outer ring along the cover portion.

Therefore, according to the present invention, the possible leak of the grease is prevented substantially completely.

Furthermore, according to the present invention, the axial extension includes the part of the core metal, and the foremost end of the core metal axially extends in the vicinity of the taper end portion up to a position on the inner side of the outer peripheral surface of the inner ring. Therefore, the axial extension is prevented from being bent radially outwardly by a centrifugal force or another external force generated when the outer ring is rotated. Therefore, even when a centrifugal force is generated due to the rotation of the outer ring, the possible leak of the grease is always prevented substantially completely. Furthermore, by virtue of the existence of the core metal, the clearance between the axial extension and the outer peripheral surface of the inner ring can be set with high accuracy.

Furthermore, in an embodiment, the taper end portion has at its axially innermost end a recess portion that is recessed radially outwardly from the opposite surface that forms the narrow passage and recessed axially outwardly from the foremost end of the rake face.

With the above arrangement, the grease that has axially moved along the outer peripheral surface of the inner ring and reached the taper end portion is firstly caught in the recess portion at the axially innermost end. Then, the mass of the grease is retained in the recess portion. Therefore, an oil component of the grease is intercepted by the mass of grease, so that the oil component of the grease is prevented from entering the narrow passage.

Furthermore, in an embodiment, the axial extension has a recess portion that is located axially outwardly with respect to the taper end portion and recessed radially outwardly with respect to the opposite surface of the taper end portion.

With this arrangement, the grease that has accidentally passed around the taper end portion is caught in the recess portion. Therefore, the possible leak of the grease is more surely prevented.

Furthermore, in an embodiment, the part of the core metal in the axial extension has an annular configuration and exists continuously around an entire peripheral surface of the inner ring.

Therefore, according to the part of the core metal, the axial extension is substantially completely prevented from being bent radially outwardly by the centrifugal force throughout the entire peripheral surface. Therefore, even when a centrifugal force is generated due to the rotation of the outer ring, the possible leak of the grease is always prevented substantially completely.

Furthermore, in an embodiment, there is provided a crown-shaped retainer that is made of resin and holds rolling members arranged between the outer ring and the inner ring. The retainer has a projection including an opposite surface that is provided oppositely to the outer peripheral surface of the inner ring axially inwardly with respect to the taper end portion, and forms between the opposite surface and the outer peripheral surface of the inner ring a narrow passage having such a specified narrowness that air is allowed to easily pass and oil is allowed to hardly pass.

According to the above embodiment, the narrow passage formed by the projection of the retainer intercepts the grease in advance of the taper end portion. Therefore, the possible leak of the grease is more surely prevented.

Furthermore, in an embodiment, a distance L1 between the retainer that holds the balls arranged between the outer ring and the inner ring axially inwardly with respect to the axial extension and the rake face of the taper end portion of the axial extension is set not smaller than a distance L2 (L1≧L2) between the retainer and the outer peripheral surface of the inner ring.

The present inventor and others have confirmed through an experiment that, when the balls are rotating while rolling between the outer ring and the inner ring, a lubricating oil circulates in a route of (balls)→(a space between the outer peripheral surface of the inner ring and the retainer)→(a space between the rake face of the taper end portion of the axial extension and the retainer)→(a space between the cover portion and the retainer)→(a space between the retainer and the outer ring)→(balls).

Then, with the distance L1 between the retainer and the rake face of the taper end portion set not smaller than a distance L2 (L1≧L2) between the retainer and the outer peripheral surface or the inner ring in a manner of the present embodiment, the lubricating oil path through the space between the rake face of the taper end portion of the axial extension and the retainer is made wider than the lubricating oil path through the space between the outer peripheral surface of the inner ring and the retainer. With this arrangement, the lubricating oil from the space between the outer peripheral surface of the inner ring and the retainer is guided to the space between the rake face of the taper end portion of the axial extension and the retainer, and the lubricating oil is made to hardly intrude into the space between the inner ring and the taper end portion. Therefore, the present embodiment has the effect of preventing the lubricating oil from intruding into the space between the inner ring and the taper end portion. Therefore, in cooperation with the sealing effect produced by the taper end portion, the possible leak of the lubricating oil is more surely prevented.

Furthermore, there is provided a bearing sealing mechanism comprising:

a bearing sealing device which is provided between an outer ring and an inner ring of a bearing in which the outer ring rotates, seals a space between the outer ring and the inner ring, and is securely fixed to the outer ring so as to rotate together with the outer ring; and a retainer which holds rolling members arranged between the outer ring and the inner ring axially inwardly with respect to the bearing sealing device, wherein said bearing sealing device has a fixed portion fixed to the outer ring a cover portion which extends radially inwardly from the fixed portion and covers a space between the outer ring and the inner ring, and a seal portion which extends radially inwardly and axially inwardly from the cover portion toward an outer peripheral surface of the inner ring, said seal portion having an opposite surface which is opposed to the outer peripheral surface of the inner ring, and forms between the opposite surface and the outer peripheral surface of the inner ring a narrow passage having a specified narrowness such that air is allowed to pass comparatively easily and oil is allowed to pass comparatively hardly, and wherein said retainer has a configuration such that a distance D1 between the retainer and the seal portion is set not smaller than a distance D2 (D1≧D2) between the retainer and the outer peripheral surface of the inner ring.

According to the above embodiment, by virtue of the dimensional setting of D1≧D2, a lubricating oil path through the space between the seal portion and the retainer is made wider than a lubricating oil path through the space between the outer peripheral surface of the inner ring and the retainer.

With the above arrangement, the lubricating oil from the space between the outer peripheral surface of the inner ring and the retainer is guided to the space between the seal portion and the retainer, and the lubricating oil is made to hardly intrude into the space between the inner ring and the seal portion. Therefore, the present embodiment has the effect of preventing the lubricating oil from intruding into the space between the inner ring and the seal portion. Therefore, in cooperation with the sealing effect produced by the taper end portion, the possible leak of the lubricating oil is more surely prevented.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will be described in detail below based on embodiments thereof with reference to the accompanying drawings.

First Embodiment

Figure 1A:
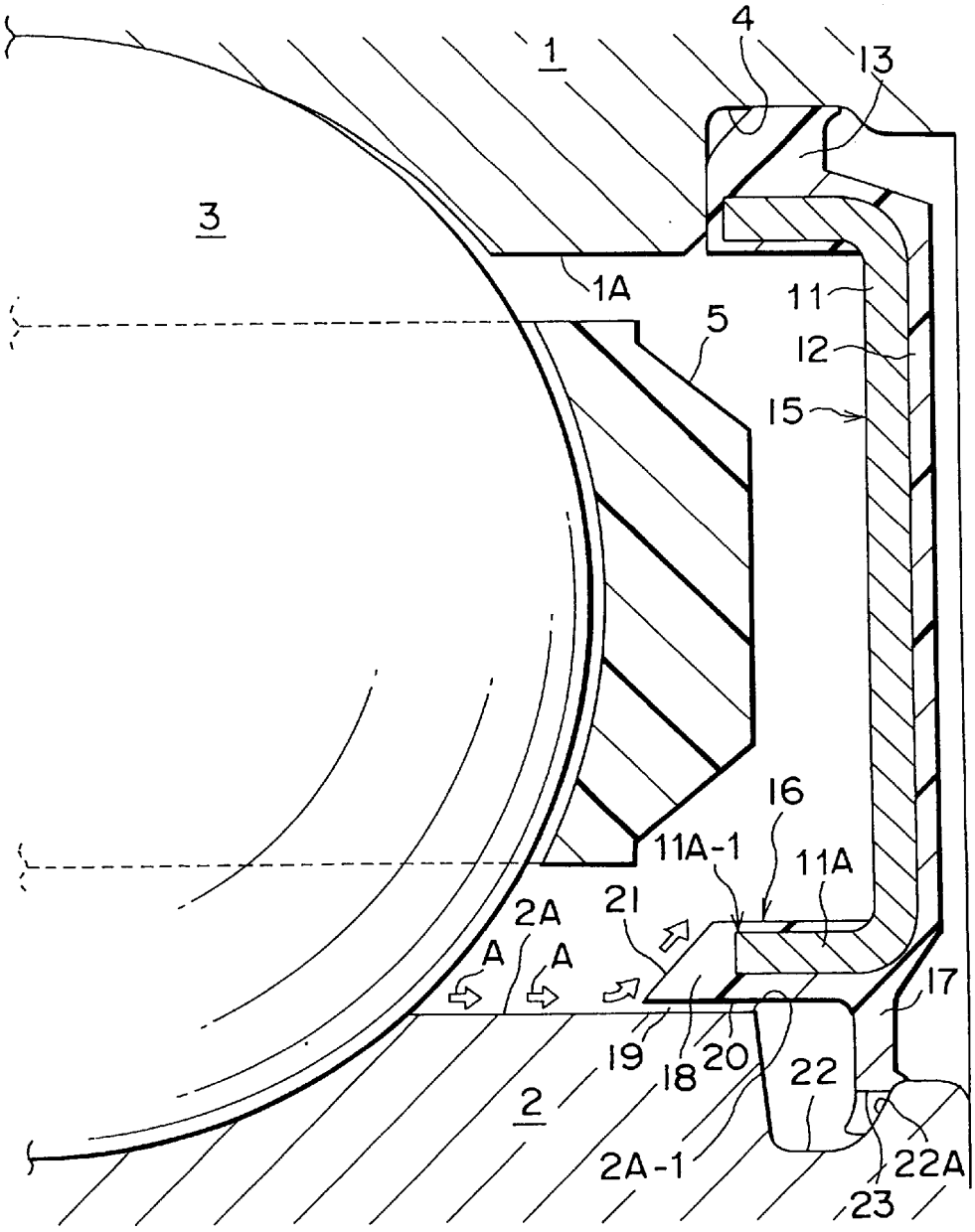
FIG. 1A is a sectional view of a bearing sealing device according to a first embodiment of the present invention.

FIG. 1A shows a bearing sealing device according to a first embodiment of the present invention. This bearing sealing device is arranged between an outer ring 1 and an inner ring 2 of a bearing in which the outer ring 1 rotates, and seals a space between the outer ring 1 and the inner ring 2. The bearing has a plurality of balls 3 arranged in a circular ring form between the outer ring 1 and the inner ring 2. To the plurality of balls 3 is fitted a crown-shaped plastic retainer 5.

The first embodiment has a sectionally bracket-shaped core metal 11 and an elastic portion 12 that is formed of an elastic material and fixed tightly to the core metal 11. The first embodiment includes a fixed portion 13 fit in and secured to a recess 4 at an axial end portion formed on an inner peripheral surface 1A of the outer ring 1, and a cover portion 15 that extends radially inwardly from the fixed portion 13 and covers a space between the outer ring 1 and the inner ring 2. The first embodiment further includes an axial extension 16 that extends axially inwardly from the cover portion 15 and a radial extension 17 that extends radially inwardly from the cover portion 15. Each part of the core metal 11 is included in the fixed portion [12] *13*, the cover portion 15 and the axial extension 16.

The axial extension 16 has a taper end portion 18. The taper end portion 18 has an opposite surface 20 that is opposite to an outer peripheral surface 2A of the inner ring 2 and forms a narrow passage 19 between the opposite surface 20 and the outer peripheral surface 2A of the inner ring 2, and a rake face 21 which forms a specified rake angle (about 45°) with the opposite surface 20.

The core metal 11 has a part 11A that extends axially inwardly from the cover portion 15. In regard to the part 11A, its foremost end 11A-1 is positioned in the vicinity of the taper end portion 18. Further, the foremost end 11A-1 is placed axially inwardly with respect to an axial outermost end 2A-1 of the outer peripheral surface 2A of the inner ring 2.

The radial extension 17 abuts on a side wall 22A located axially outwardly of a radially recessed annular groove 22 formed at an axial end portion adjacent to the outer peripheral surface 2A of the inner ring 2. The radial extension 17 has axially penetrating notches 23. The notches 23 are formed in a plurality of portions of the radial extension 17 circumferentially at specified intervals.

According to the bearing sealing device having the above construction, the opposite surface 20 of the taper end portion 18 forms a narrow passage 19 between the opposite surface 20 and the outer peripheral surface 2A of the inner ring 2. The narrow passage 19 allows air to pass easily, but it allows grease to hardly pass therethrough. That is to say, the narrow passage 19 does not substantially allow grease to pass therethrough. Therefore, as indicated by arrows A in FIG. 1, grease moving axially outwardly on the outer peripheral surface 2A of the inner ring 2 is moved along the rake face 21 having a specified rake angle (about 45°) upon reaching the taper end portion 18. The rake angle of the rake face 21 may be smaller than 45°. The grease is, so to speak, scooped up by the rake face 21. Then, the grease moving along the rake face 21 is guided along the cover portion 15 to the outer ring 1.

Therefore, according to the first embodiment, the possible leak of grease is substantially completely prevented.

Furthermore, according to the first embodiment, the axial extension 16 includes the part 11A of the core metal 11 where the foremost end 11A-1 is in the vicinity of the taper end portion 18. Further, the foremost end 11A-1 of the part 11A is located axially inwardly with respect to the axial outermost end 2A-1 of the outer peripheral surface 2A of the inner ring 2. Therefore, the axial extension 16 is prevented from being bent radially outwardly by a centrifugal force generated when the outer ring 1 is rotated. Therefore, even when a centrifugal force is generated on the axial extension 16 due to the rotation of the outer ring 1, the possible leak of grease is always prevented substantially completely. Furthermore, by virtue of the existence of the foremost end 11A-1, a clearance between the axial extension 16 and the outer peripheral surface 2A of the inner ring 2 is set with high accuracy.

Furthermore, the part 11A of the core metal 11 exists continuously in an annular form around the entire outer peripheral surface of the inner ring 2. Therefore, the axial extension 16 is prevented from being bent radially outwardly by the centrifugal force throughout the entire periphery. Therefore, even when a centrifugal force is generated on the axial extension 16 due to the rotation of the outer ring 1, the possible leak of grease is always prevented substantially completely.

Figure 1B:
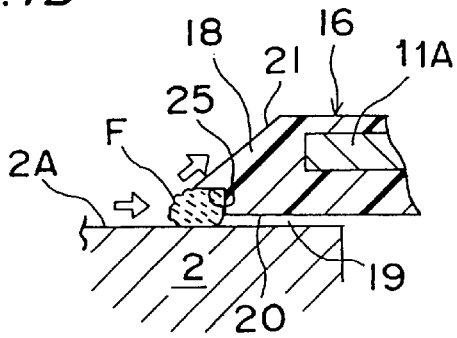
FIG. 1B is a sectional view of an essential part of a modification embodiment of the first embodiment.

In the first embodiment, the axial foremost end of the taper end portion 18 has an acutely sharpened configuration. However, as shown in FIG. 1B, it is acceptable to provide a recess portion 25 that is recessed radially outwardly from the opposite surface 20 that forms the narrow passage 19 and recessed axially outwardly from the foremost end of the rake face 21 at the axial foremost end of the taper end portion 18. With this arrangement, the grease that has axially moved along the outer peripheral surface 2A of the inner ring 2 and reached the taper end portion 18 is firstly caught in the recess portion 25 at the axially innermost end. Then, a mass F of the grease is retained in the recess portion 25. Therefore, an oil component of the grease is intercepted in the mass F of the grease, so that the oil component of the grease is prevented from entering the narrow passage 19.

Figure 1C:
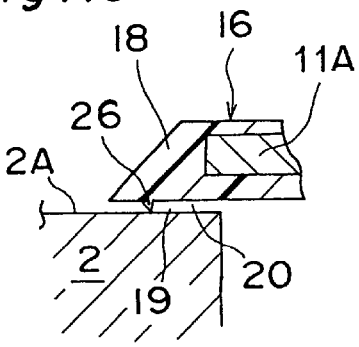
FIG. 1C is a sectional view of an essential part of another modification embodiment of the first embodiment.

Furthermore, as shown in FIG. 1C, it is acceptable to provide a small projection 26 that is put in contact with the outer peripheral surface 2A of the inner ring 2 on the opposite surface 20 of the taper end portion 18. The small projection 26 can slightly bend to thereby allow air to pass therearound. With this arrangement, the small projection 26 intercepts a very small amount of the oil component of the grease, and therefore the very small amount of the oil component of the grease is prevented from leaking through the narrow passage 19.

Second Embodiment

Figure 2:
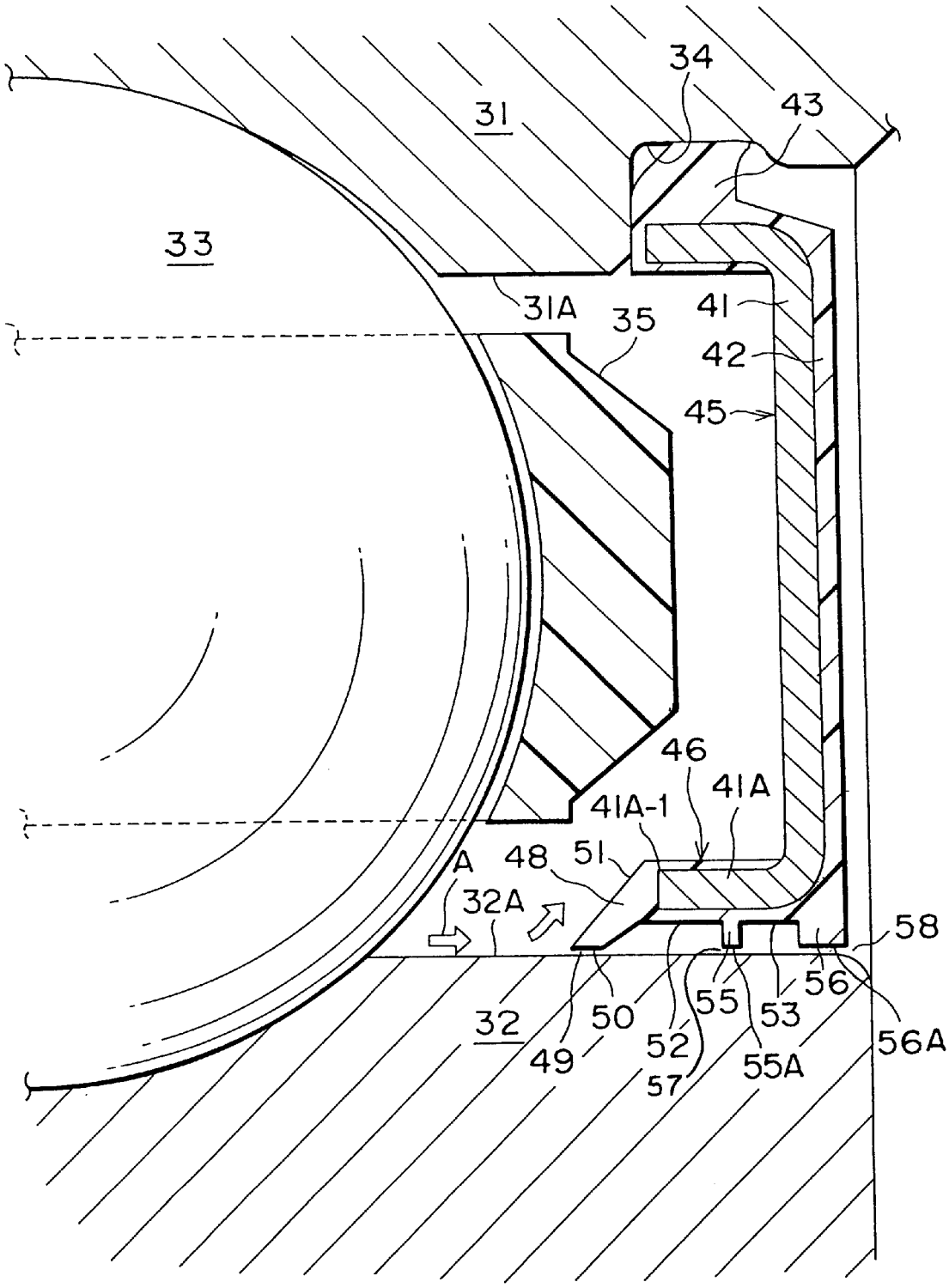
FIG. 2 is a sectional view of a second embodiment of the present invention.

Next, FIG. 2 shows a second embodiment. The second embodiment is a bearing sealing device arranged between an outer ring 31 and an inner ring 32 of a bearing in which the outer ring 31 rotates, and seals a space between the outer ring 31 and the inner ring 32. The bearing has a plurality of balls 33 arranged in an annular form between the outer ring 31 and the inner ring 32. To the plurality of balls 3 is fitted a crown-shaped plastic retainer 35.

The second embodiment has a sectionally bracket-shaped core metal 41 and an elastic portion 42 that is made of an elastic material and fixed tightly to the core metal 41. The second embodiment includes a fixed portion 43 fit in and secured to a recess 34 at an axial end portion formed on an inner peripheral surface 31A of the outer ring 31, and a cover portion 45 that extends radially inwardly from the fixed portion 43 and covers a space between the outer ring 31 and the inner ring 32. The second embodiment further includes an axial extension 46 that extends axially inwardly from the cover portion 45.

The axial extension 46 has a taper end portion 48. The taper end portion 48 includes an opposite surface 50 that is opposed to the outer peripheral surface 32A of the inner ring 32 and forms a narrow passage 49 between the opposite surface 50 and an outer peripheral surface 32A of the inner ring 32, and a rake face 51 that forms a specified rake angle (approximately 45°) with the opposite surface 50.

The axial extension 46 has two recess portions 52 and 53 located axially outwardly with respect to the taper end portion 48. The recess portions 52 and 53 are recessed radially outwardly by a specified dimension with respect to the opposite surface 50 of the taper end portion 48. The axial extension 46 has an annular projection 55 that extends circumferentially between the recess portions 52 and 53, and an annular projection 56 that adjoins axially outwardly to the recess portion 53. The annular projections 55 and 56 have opposite surfaces 55A and 56A opposite to the outer peripheral surface 32A of the inner ring 32. The opposite surfaces 55A and 56A are arranged in approximately the same radial positions as that of the opposite surface 50 of the taper end portion 48. Therefore, the opposite surfaces 55A and 56A form narrow passages 57 and 58 between them and the outer peripheral surface 32A of the inner ring 32.

The core metal 41 has a part 41A that extends axially inwardly from the cover portion 45. The part 41A extends axially along the outer peripheral surface 32A of the inner ring 32 oppositely to the outer peripheral surface 32A, and its foremost end 41A-1 is positioned in the vicinity of the taper end portion 48. There are provided two recess portions 52 and 53 located axially outwardly with respect to the taper end portion 48. However, there may be provided three or more such recess portions.

According to the bearing sealing device having the above construction, the opposite surface 50 of the taper end portion 48 forms the narrow passage 49 between the opposite surface 50 and the outer peripheral surface 32A of the inner ring 32. The narrow passage 49 allows air to pass easily, but it allows grease to hardly pass therethrough. Therefore, as indicated by an arrow A in FIG. 2, the grease moving axially outwardly on the outer peripheral surface 32A of the inner ring 32 is moved along the rake face 51 having a specified rake angle (about 45°) upon reaching the taper end portion 48. The grease is, so to speak, scooped by the rake face 51. Then the grease moving along the rake face 51 is guided along the cover portion 45 to the outer ring 31.

Furthermore, the grease that has accidentally passed around the taper end portion 48 is intercepted in the recess portion 52, and the grease that has passed through the narrow passage 57 is intercepted in the subsequent recess portion 53. Therefore, according to the second embodiment, the possible leak of grease is more surely prevented.

Furthermore, according to the second embodiment, the axial extension 46 includes the part 41A of the core metal 41 that is arranged oppositely to the outer peripheral surface 32A of the inner ring 32, where the foremost end 41A-1 of the part 41A extends to an axial position in the vicinity of the taper end portion 48. Therefore, the part 41A can prevent the axial extension 46 from being bent radially outwardly by a centrifugal force generated when the outer ring 31 is rotated. Therefore, even when a centrifugal force is generated on the axial extension 46 due to the rotation of the outer ring 31, the possible leak of grease is always prevented substantially completely, Furthermore, by virtue of the existence of the part 41A, a clearance between the axial extension 46 and the outer peripheral surface 32A of the inner ring 32 is set with high accuracy.

Furthermore, the part 41A of the core metal 41 exists continuously in an annular form around the entire outer peripheral surface of the inner ring 32. Therefore, the axial extension 46 is prevented from being bent radially outwardly throughout the entire periphery by the centrifugal force. Therefore, even when a centrifugal force is generated due to the rotation of the outer ring 31, the possible leak of grease is always prevented substantially completely.

Third Embodiment

Figure 3:
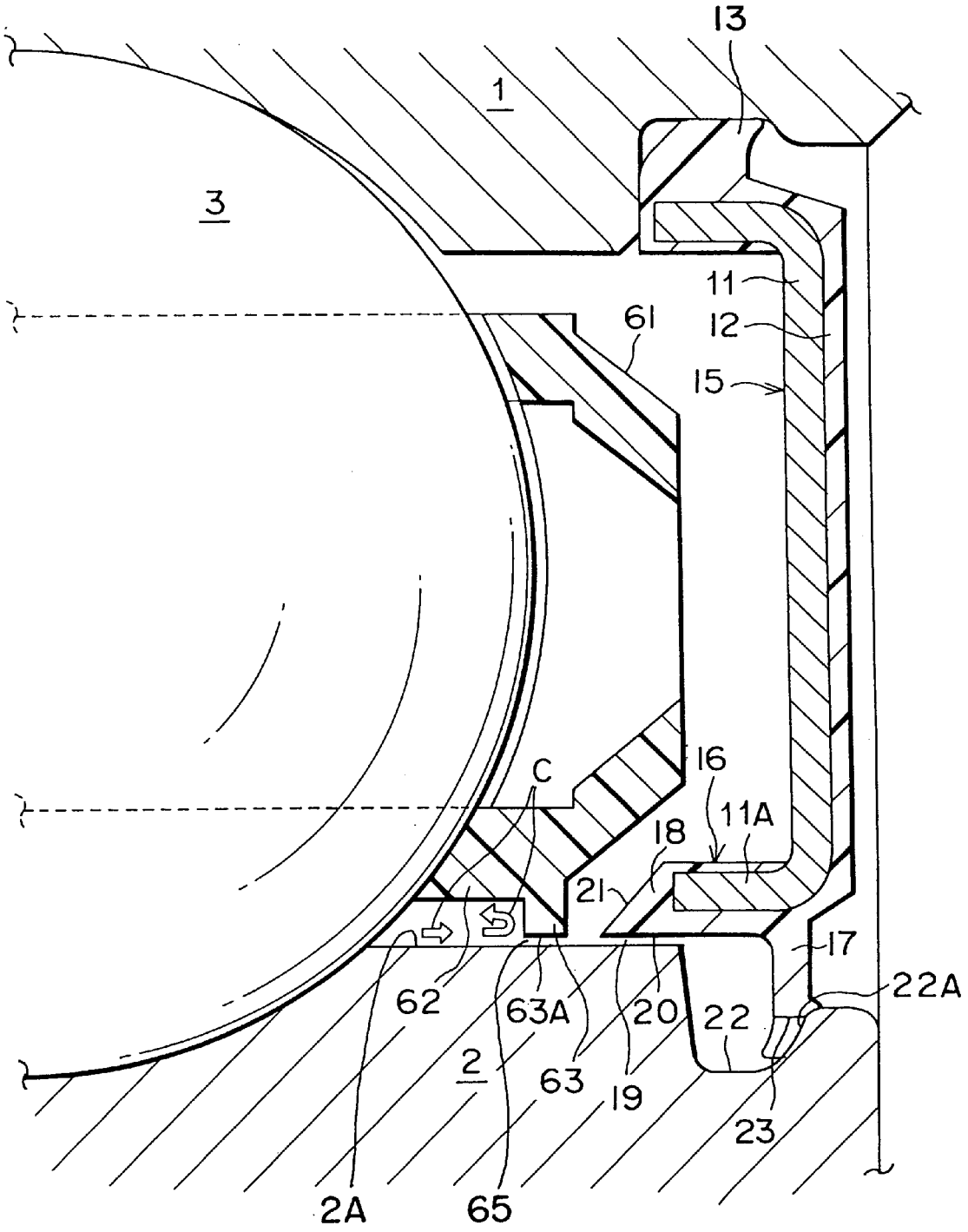
FIG. 3 is a sectional view of a third embodiment of the present invention.

Next, FIG. 3 shows a third embodiment. The third embodiment differs from the first embodiment in the construction of a retainer 61 of the bearing. Therefore, the third embodiment will be described intensively on the retainer 61. It should be noted that the same elements as in the first embodiment are shown by the same reference numerals as in the first embodiment.

The retainer 61 has a projection 63 that projects radially inwardly from an inner radial portion 62. The projection 63 has an opposite surface 63A arranged oppositely to the outer peripheral surface 2A of the inner ring 2 axially inwardly with respect to the taper end portion 18, and the opposite surface 63A forms a narrow passage 65 between the opposite surface 63A and the outer peripheral surface 2A of the inner ring 2. The narrow passage 65 allows air to pass easily, but it allows grease to hardly pass therethrough. Therefore, according to the third embodiment, as indicated by arrows C in FIG. 3, the grease moving axially outwardly is intercepted by the projection 63 before the taper end portion 18. Therefore, according to the third embodiment, the possible leak of grease is more surely prevented.

The retainer of the bearing is implemented by a crown-shaped retainer made of resin in the first through third embodiments, however, it may be a wave-shaped retainer made of iron. Furthermore, the sealing device is provided axially on one side of the bearing in the first through third embodiments, however, it may be provided on both sides of the bearing.

Fourth Embodiment

Figure 4:
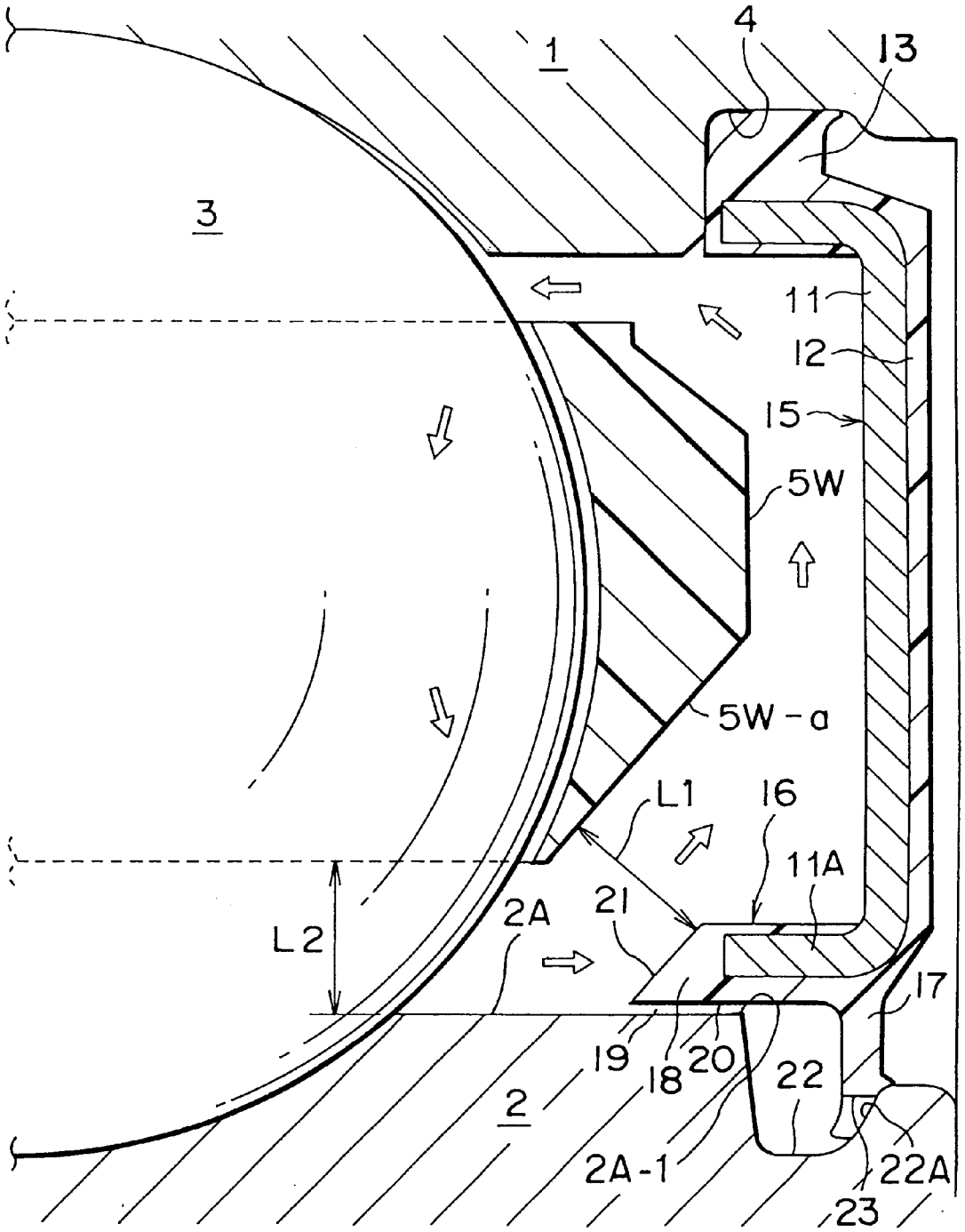
FIG. 4 is a sectional view of a fourth embodiment of the present invention.

Next, FIG. 4 shows a fourth embodiment. The fourth embodiment differs from the first embodiment only in the configuration of a retainer 5W. Therefore, the fourth embodiment will be described preponderantly on the point different from the first embodiment. It should be noted that the same elements as in the first embodiment are shown by the same reference numerals as in the first embodiment.

The retainer 5W supports the balls 3 arranged between the outer ring 1 and the inner ring 2 axially inwardly with respect to the axial extension 16. The retainer 5W has a slant surface 5W-a arranged oppositely and approximately in parallel to the rake face 21 of the taper end portion 18. A distance L1 between the slant surface 5W-a and the rake face 21 is set not smaller than a distance L2 ($L1 \geqq L2$) between the retainer 5W and the outer peripheral surface 2A of the inner ring 2.

It was found through an experiment that, when the balls 3 are rotating while rolling between the outer ring 1 and the inner ring 2, the lubricating oil circulates in a route of (balls 3)→(a space between the outer peripheral surface 2A of the inner ring 2 and the retainer 5W)→(a space between the rake face 21 of the taper end portion 18 of the axial extension 16 and the retainer 5W)→(a space between the cover portion 15 and the retainer 5W)→(a space between the retainer 5Wand the outer ring 1)→(balls 3) as indicated by void arrows in FIG. 4.

Therefore, the dimensional setting of $L1 \geqq L2$ means that the lubricating oil path through the space between the rake face 21 of the taper end portion 18 of the axial extension 16 and the retainer 5W is made wider than the lubricating oil path through the space between the outer peripheral surface 2A of the inner ring 2 and the retainer 5W. With this arrangement, the lubricating oil from the space between the outer peripheral surface 2A of the inner ring 2 and the retainer 5W is guided to the space between the rake face 21 of the taper end portion 18 of the axial extension 16 and the retainer 5W, and the lubricating oil is hardly introduced into the narrow passage 19 between the inner ring 2 and the taper end portion 18. Therefore, the fourth embodiment has the effect of preventing the lubricating oil from intruding into the space between the inner ring 2 and the taper end portion 18. Therefore, in cooperation with the sealing effect produced by the taper end portion 18, the possible leak of the lubricating oil is more surely prevented.

Fifth Embodiment

Figure 5:
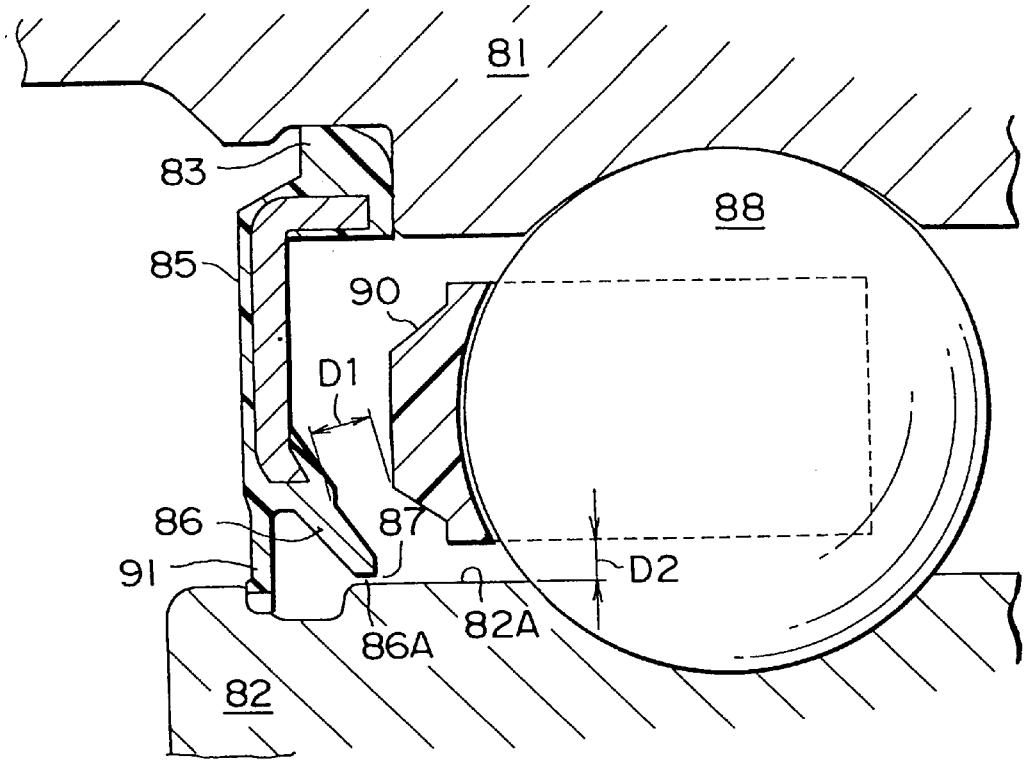
FIG. 5 is a sectional view of a fifth embodiment of the present invention.

Next, FIG. 5 shows a fifth embodiment. The fifth embodiment is arranged between an outer ring 81 and an inner ring 82 of a bearing in which the outer ring 81 rotates, and operates to seal a space between the outer ring 81 and the inner ring 82. The fifth embodiment has a bearing sealing device that is securely fixed to the outer bearing 81 and is rotated together with the outer ring 81.

The bearing sealing device includes a fixed portion 83, a cover portion 85 and a seal portion 86. The fixed portion 83 is fixed to the outer ring 81. The cover portion 85 extends radially inwardly from the fixed portion 83 and covers the space between the outer ring 81 and the inner ring 82. The seal portion 86 extends radially inwardly and axially inwardly from the cover portion 85 toward an outer peripheral surface 82A of the inner ring 82. The seal portion 86 has an opposite surface 86A arranged oppositely to the outer peripheral surface 82A of the inner ring 82. The opposite surface 86A forms a narrow passage 87 that allows air to easily pass and allows oil to hardly pass therethrough between the opposite surface 86A and the outer peripheral surface 82A of the inner ring 82. It is to be noted that a seal lip 91 has the same structure as that of the radial extension 17 of the first embodiment and operates to prevent the possible intrusion of dust.

Furthermore, the present fifth embodiment includes a retainer 90 that supports balls 88 arranged between the outer ring 81 and the inner ring 82 axially inwardly with respect to the cover portion 85. In regard to the retainer 90, a distance D1 between the retainer 90 and the seal portion 86 is set not smaller than a distance D2 between the retainer 90 and the outer peripheral surface 82A of the inner ring 82. In practice, the distance D1 is set 1.8 times as great as the distance D2.

The dimensional setting of D1≧D2 means that the lubricating oil path through the space between the seal portion 86 and the retainer 90 is made wider than the lubricating oil path through the space between the outer peripheral surface 82A of the inner ring 82 and the retainer 90. With this arrangement, the lubricating oil from the space between the outer peripheral surface 82A of the inner ring 82 and the retainer 90 is guided to the space between the seal portion 86 and the retainer 90, and the lubricating oil is allowed to hardly intrude into the narrow passage 87 between the inner ring 82 and the seal portion 86. Therefore, the fifth embodiment has the effect of preventing the lubricating oil from intruding into the space between the inner ring 82 and the seal portion 86. Therefore, in cooperation with the sealing effect produced by the seal portion 86, the possible leak of the lubricating oil is more surely prevented.

Experimental Embodiment

Figure 6:
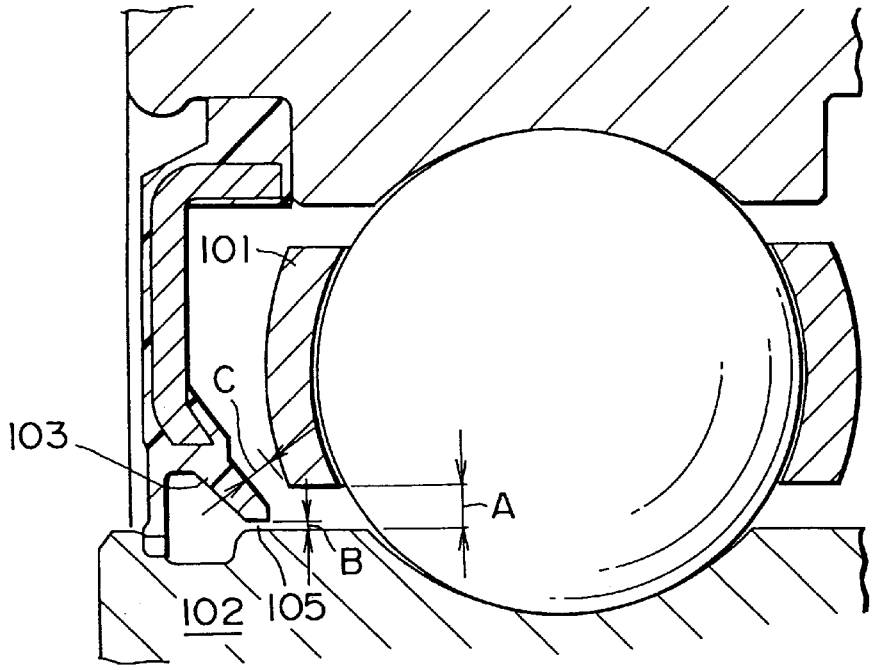
FIG. 6 is a view showing dimensions of an essential part of a bearing sealing mechanism for explaining an exemplified experiment of leak of grease.

A bearing having a structure similar to the bearing shown in FIG. 5 was subjected to a grease leak experiment, and an analysis of the obtained results will be described below. In the present experiment, the bearing has a shaft diameter of 38.2 mm. The present experiment was conducted by setting a plurality of combinations of a distance A between a press retainer 101 made of a soft steel and an inner ring 102, a distance B between a seal portion 103 and the inner ring 102, and a distance C between the retainer 101 and the seal portion 103 as shown in FIG. 6. Then, the grease leak amount of each combination was measured. Based on the results of measurement, results of a single regression analysis of the distance A, distance B and distance C relative to the grease leak amount are shown in Table 1.

TABLE 1

<Correlation coefficient matrix>
(Single correlation)

| Variable | A | B | C | Leak amount |
|---|---|---|---|---|
| 1A | 1.0000 | 0.3235 | 0.9146 | −0.6905 |
| 2B | 0.3235 | 1.0000 | 0.2339 | 0.0256 |
| 3C | 0.9146 | 0.2339 | 1.0000 | −0.6848 |
| 4 Leak amount | −0.6905 | 0.0256 | −0.6848 | 1.0000 |

Figure 7:
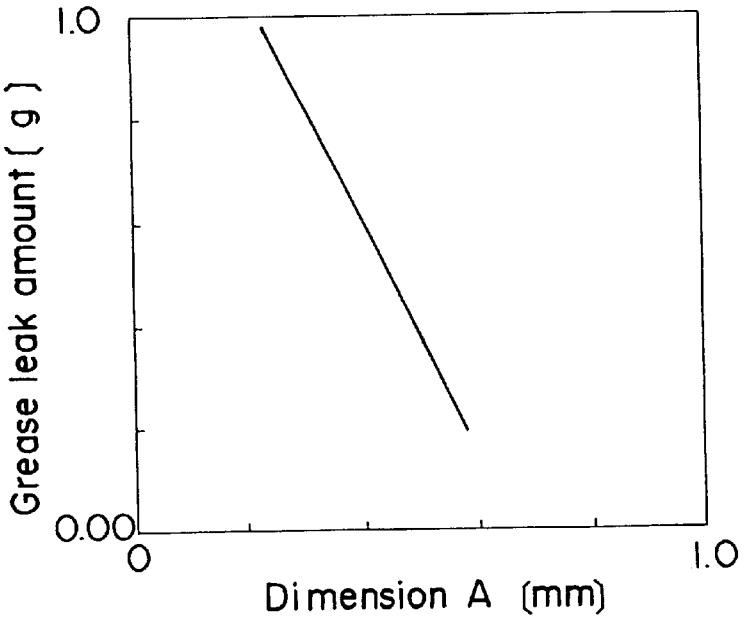
FIG. 7 is a graph showing a regression curve of a relation between a dimension and the leak of the grease in the above experiment.
Figure 8:
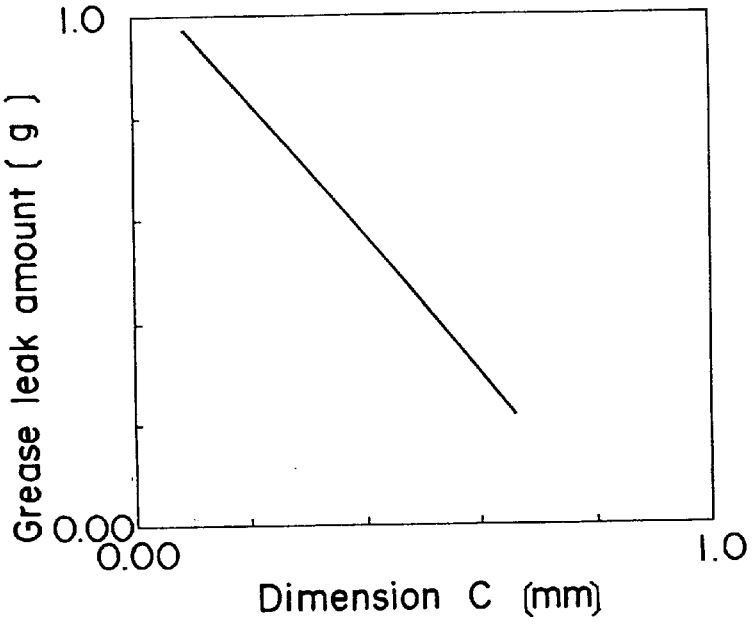
FIG. 8 is a graph showing a regression curve of a relation between a dimension C and the leak of the grease in the above experiment.
Figure 9:
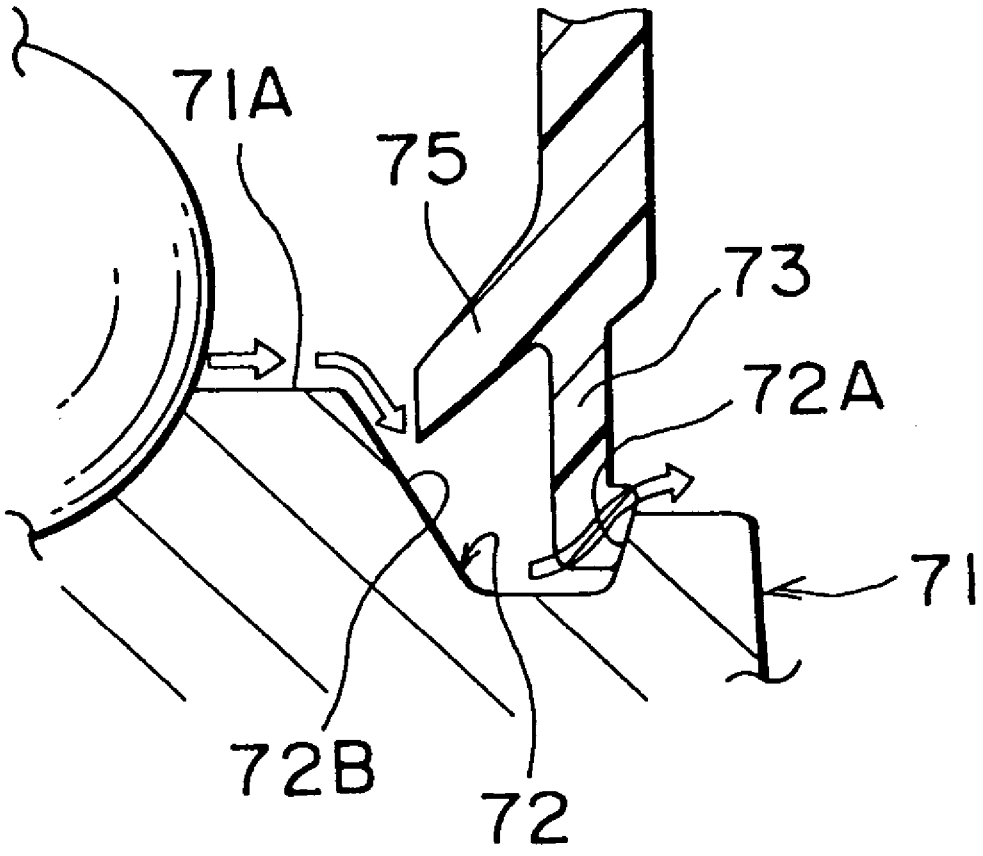
Fig. 9 PRIOR ART
FIG. 9 is a view showing the structure of a prior art bearing sealing device.

Table 1 is a correlation coefficient matrix. As apparent from Table 1, the grease leak amount has a strong correlation with the distance A and the distance C, but it has a weak correlation with the distance B. Therefore, it is found that the distance A and the distance C are important in order to prevent the leak of the grease. Curves representing single regression expressions obtained from the results of the single regression analysis are shown in FIGS. 7 and 8. A regression curve representing the relation between the grease leak amount and the distance A is shown in FIG. 7, while a regression curve representing the relation between the grease leak amount and the distance C is shown in FIG. 8.

Further, as the result of conducting a multiple correlation analysis of the distance A, the distance B and the distance C relative to the grease leak amount, there was obtained a multiple correlation coefficient R=[0,744] *0.744*, where the correlation is significant at a level of dangerousness of not greater than 1%. That is, according to the results of the multiple correlation analysis, each of the distance A, the distance B and the distance C has a strong correlation with the grease leak amount. From the results of the multiple correlation analysis, the following Equation (1) was able to be derived. It is to be noted that the unit of the grease leak amount is gram, while the unit of the distances A, B and C is millimeter.

$$(\text{Grease leak amount})=(-1.976)A+3.14B+(-0.088)C \quad (1)$$

Then, by substituting B=0.2 (mm) and a leak amount=0.0 (g) into Equation (1) to simplify the equation, the following Equation (2) is derived.

$$1.976A+0.088C=1.745 \quad (2)$$

Meanwhile, it is found that the leak of the grease is prevented when (distance C)[→] ≧(distance A) according to a hydromechanical way of thinking. Therefore, by substituting A=C into Equation (2), C=0.85 is calculated.

Accordingly, there is derived the conclusion that the leak of the grease can be prevented by satisfying the conditions of C≧0.85 mm and A[≧] ≦C when the shaft diameter of the bearing is 38.2 mm.

The sealing device is provided on one side of the bearing in the fourth and fifth embodiments, however, it may be provided in spaces on both sides in the axial direction.

The above embodiments employ balls as rolling members. But, rollers may also be used as rolling members.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A *bearing sealing mechanism for a bearing including an outer ring and an inner ring in which the outer ring rotates, and rolling members arranged between the outer ring and the inner ring, said bearing sealing mechanism comprising:*

*a* bearing sealing device which is provided between [an] *the* outer ring and [an] inner ring [of a bearing in which the outer ring rotates], seals a space between the outer ring and the inner ring, and is securely fixed to the outer ring so as to rotate together with the outer ring, *said bearing sealing device* comprising:

a fixed portion fixed to the outer ring;

a cover portion which extends in a radially inward direction of the outer ring from the fixed portion and covers the space between the outer ring and the inner ring; and an axial extension which is made of an elastic material and extends in an axially inward direction of the outer ring from the cover portion, wherein the axial extension includes a taper end portion having an opposite surface which is opposed to an outer peripheral surface of the inner ring and forms between the opposite surface and the outer peripheral surface of the inner ring a narrow passage having a specified narrowness such that air is allowed to pass comparatively easily and oil is allowed to pass comparatively hardly, and a rake face forming a specified rake angle with the opposite surface; and the fixed portion, the cover portion and the axial extension respectively include part of a core metal, said core metal extending axially inwardly from the cover portion up to a position on a radially outer side of the outer peripheral surface of the inner ring, where a foremost end of the core metal is positioned in the vicinity of the taper end portion; and

*a retainer which holds the rolling members arranged between the outer ring and the inner ring axially inwardly with respect to the axial extension wherein*

*said retainer has a configuration such that a distance L1 between the retainer and the rake face of the taper end portion of the axial extension is larger than a distance L2 (L1>L2) between the retainer and the outer peripheral surface of the inner ring.*

2. A bearing sealing [device] *mechanism* as claimed in claim 1, wherein the taper end portion comprises at its axial innermost end a recess portion which is recessed radially outwardly from the opposite surface that forms the narrow passage and recessed axially outwardly from a foremost end of the rake face.

3. A bearing sealing [device] *mechanism* as claimed in claim 1, wherein the axial extension comprises:

a recess portion which is located axially outwardly with respect to the taper end portion and recessed radially outwardly with respect to the opposite surface of the taper end portion.

4. A bearing sealing [device] *mechanism* as claimed in claim 1, wherein the part of the core metal in the axial extension has an annular configuration existing continuously around an entire outer periphery of the inner ring.

[5. A bearing sealing mechanism comprising:

a bearing sealing device as claimed in claim 1; and a crown-shaped retainer which is made of resin and holds rolling members arranged between the outer ring and the inner ring, wherein said retainer has a projection including an opposite surface that is provided oppositely to the outer peripheral surface of the inner ring axially inwardly with respect to the taper end portion, and forms between the opposite surface and the outer peripheral surface of the inner ring a narrow passage having a specified narrowness such that air is allowed to pass comparatively easily and oil is allowed to pass comparatively hardly.]

[6. A bearing sealing mechanism comprising:

a bearing sealing device as claimed in claim 1; and a retainer which holds rolling members arranged between the outer ring and the inner ring axially inwardly with respect to the axial extension, wherein said retainer has a configuration such that a distance L1 between the retainer and the rake face of the taper end portion of the axial extension is set not smaller than a distance L2 (L1≧L2) between the retainer and the outer peripheral surface of the inner ring.]

[7. A bearing sealing mechanism comprising:

a bearing sealing device which is provided between an outer ring and an inner ring of a bearing in which the outer ring rotates, seals a space between the outer ring and the inner ring, and is securely fixed to the outer ring so as to rotate together with the outer ring; and a retainer which holds rolling members arranged between the outer ring and the inner ring axially inwardly with respect to the bearing sealing device, wherein said bearing sealing device has a fixed portion fixed to the outer ring a cover portion which extends radially inwardly from the fixed portion and covers a space between the outer ring and the inner ring, and a seal portion which extends radially inwardly and axially inwardly from the cover portion toward an outer peripheral surface of the inner ring, said seal portion having an opposite surface which is opposed to the outer peripheral surface of the inner ring, and forms between the opposite surface and the outer peripheral surface of the inner ring a narrow passage having a specified narrowness such that air is allowed to pass comparatively easily and oil is allowed to pass comparatively hardly, and wherein said retainer has a configuration such that a distance D1 between the retainer and the seal portion is set not smaller than a distance D2 (D1≧D2) between the retainer and the outer peripheral surface of the inner ring.]

* * * * *